J. C. Blythe.
Mill Bolt.
No. 3,472.
Reissued Jun. 1, 1869.
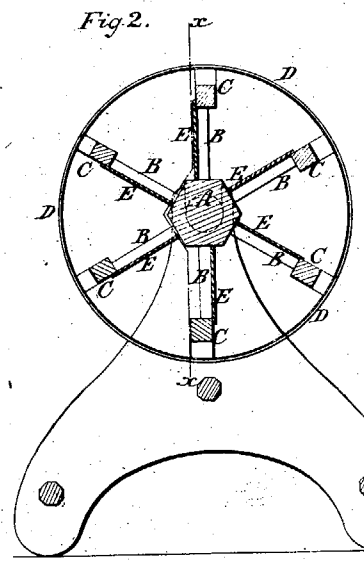
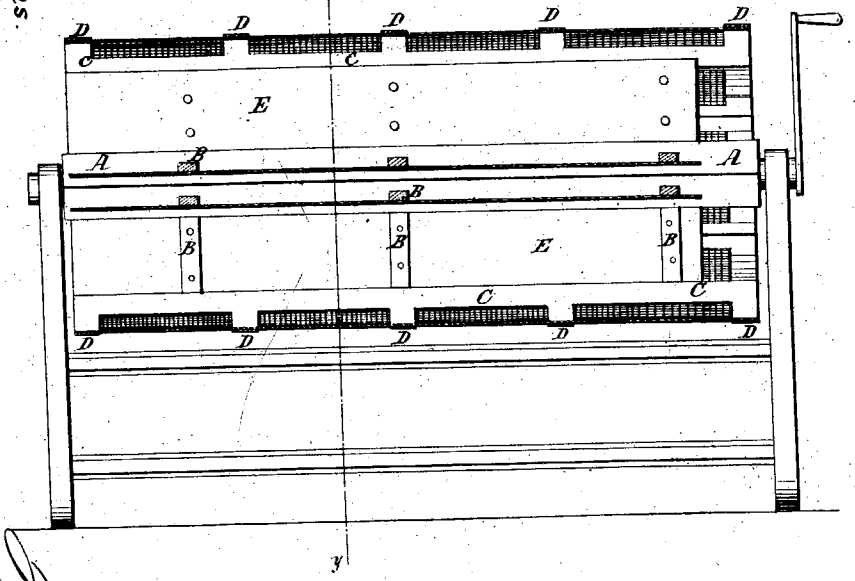
Witnesses.
Jas. A. Lewis
M. B. Lovington.
Inventor.
J. C. Blythe
Per Munn & Co
attys.

United States Patent Office.

J. C. BLYTHE, MARK JOHNSON, JAMES S. NOBLES, AND CHARLES W. G. NOBLES, OF PERRY, NEW YORK, ASSIGNEES OF J. C. BLYTHE.

*Letters Patent No.* 56,887, *dated August* 7, 1866; *reissue No.* 3,472, *dated June* 1, 1869.

IMPROVEMENT IN FLOUR-BOLTS.

The Schedule referred to in these Letters Patent and making part of the same.

*To all whom it may concern:*

Be it known that J. C. BLYTHE, of Perry, in the county of Wyoming, and State of New York, did invent a certain new and useful Improvement in Flour-Bolts, patented August 7, 1866, of which patent, we, J. C. BLYTHE, MARK JOHNSON, JAMES S. NOBLES, and CHARLES W. G. NOBLES, of Perry, aforesaid, are sole assignees; and we do hereby declare that the following is a full and exact description thereof, reference being had to the accompanying drawings, making part of this specification.

Figure 1 is a longitudinal section of the bolt in plane of line *x x*, fig. 2.

Figure 2, a cross-section, in plane *y y*, fig. 1.

Like letters of reference indicate corresponding parts in both figures.

This invention has for its object to furnish a flour-bolt, in which the whole surface of the cloth is economized, and no obstruction experienced from the ribs or other interior arrangement.

In the drawings—

A indicates the bolt-shaft, to which motion is communicated in the ordinary manner.

B B are arms, which project from the shaft in the usual way, and at such distances apart as will conveniently support the longitudinal ribs C C. These ribs are securely attached to the ends of the arms B B.

Around the bolt, at suitable distances apart, and corresponding preferably with the position of the arms, are hoops D D, attaching to the ribs by screws or otherwise, so as to be removable when desired.

Between the hoops D D, the ribs have their outer parts cut away, or elevated by some device, so as to leave open spaces *p p*, thereby securing an unbroken surface of the bolting-cloth all the way around in the line of these spaces, and indeed the whole length of the bolt, except simply at the attachment of the hoops.

The several spaces between the hoops are covered by bolting-cloths of varying or graduating degrees of fineness, for instance, commencing the head of the bolt with the coarsest, (as No. 8,) and following with finer numbers in order. The cloths can be removed from a bolt of this kind by simply removing the hoops.

Partitions E E may be employed, extending radially from the bolt-shaft to the ribs, and dividing the interior central space into angular or wedge-shaped compartments, as clearly shown in fig. 2.

The great difficulty in ordinary flour-bolts is that the ribs extending the whole length come in contact with and cover a portion of the surface of the bolting-cloth, which portion covered, of course, is lost to the sifting-action. Also, the ribs standing in from the cloth with which they are in contact, form ledges that obstruct the flour in its passage around, causing it to fall even far beyond the base of the ribs as it goes over. In this manner, a very large portion of the bolting-surface is lost to use, amounting in some cases to nearly half.

It is the object of this invention to obviate these difficulties by removing every impediment from the circle of the inner surface of the bolt, thereby allowing the flour to keep in contact with the screening-cloth all the way round, by which great saving is effected in time and expense, and the percentage of flour obtained is increased.

The ribs C C, by setting back away from contact with the bolting-cloth, not only free the said cloth from obstruction, but also, in some cases, serve as breakers or agitators by standing in the pathway of the material being acted on, and still allowing it to pass under.

By the employment of the partitions E E, the compartments thereby formed receive the coarser particles of flour as they fly from the cloth, leaving the finer parts in contact with the cloth, which, together with the retreating ribs, so increases the bolting-capacity as to have a marked effect in the amount of flour produced.

What we claim as the invention of the said J. C. BLYTHE, is—

1. The combination, with the bolting-screen or cylinder, and the arms B B, sustaining the same, of the ribs C C, retreating or standing back, as described, so as to give a free sifting-action to the whole circle of the bolting-cloth, in the manner and for the purpose specified.

2. The combination, with the bolting-screen or cylinder, and the arms B B sustaining the same, of the radial partitions E E, dividing the interior of the said screen or cylinder into compartments, in the manner and for the purposes specified.

3. The combination, with the bolting-screen or cylinder, and the ribs C C, and arms B B sustaining the same, of the hoops D D, attaching and holding in line of the arms, and removable at pleasure, as herein set forth.

4. The construction and mode of attaching the bolting-screen or cylinder with an inside skeleton, substantially as described, whereby the whole inner surface of the bolting-cloth, except the parts covered by the hoops D D, is free and unobstructed, as herein set forth.

J. C. BLYTHE.
MARK JOHNSON.
JAMES S. NOBLES.
C. W. G. NOBLES.

Witnesses:
GEO. BUCKINGHAM,
GEO. W. HARRINGTON.